US006177527B1

(12) United States Patent
Sishta et al.

(10) Patent No.: US 6,177,527 B1
(45) Date of Patent: Jan. 23, 2001

(54) PROCESS FOR THE PREPARATION OF POLYETHYLENE OR POLYPROPYLENE

(75) Inventors: Purna Chand Sishta, Whitehouse Station; Xinmin Yang, Somerset; Frederick John Karol, Belle Meade, all of NJ (US)

(73) Assignee: Union Carbide Chemical & Plastics Technology Corporation, Danbury, CT (US)

( * ) Notice: Under 35 U.S.C. 154(b), the term of this patent shall be extended for 0 days.

(21) Appl. No.: 09/149,579

(22) Filed: Sep. 8, 1998

(51) Int. Cl.[7] ........................................................ C08F 4/52
(52) U.S. Cl. .......................... 526/134; 526/160; 526/352; 526/351; 526/348.6; 526/348.4; 526/348.2
(58) Field of Search ..................................... 526/134, 160, 526/352, 351, 348.6, 348.4, 348.2

(56) References Cited

U.S. PATENT DOCUMENTS

| 5,278,264 | * | 1/1994 | Spaleck et al. | 526/127 |
| 5,672,668 | | 9/1997 | Winter et al. | 526/127 |
| 5,852,143 | * | 12/1998 | Sishta et al. | 526/127 |

FOREIGN PATENT DOCUMENTS

| 819695 | 1/1998 | (EP) . |
| WO95/35333 | 12/1995 | (WO) . |

* cited by examiner

*Primary Examiner*—David W. Wu
*Assistant Examiner*—Caixia Lu
(74) *Attorney, Agent, or Firm*—Saul R. Bresch

(57) ABSTRACT

A process for the preparation of (i) polyethylene or (ii) polypropylene, which is essentially isotactic or a mixture of atactic and isotactic polypropylenes comprising contacting ethylene or propylene per se, or in admixture with one or more alpha-olefins, under polymerization conditions, with a catalyst system comprising:

(a) a precatalyst comprising a mixture of racemic and meso stereoisomers of a metallocene catalyst containing two cycloalkadienyl ligands joined by a bridging linkage, said ligands complexed to a metal atom; and (b) (1) to obtain polyethylene catalyzed by the rac epimer only, a cocatalyst selected from the group consisting of tris(perfluorophenyl)borane and isobutyl alumoxane;

(2) to obtain polyethylene catalyzed by both the rac and the meso epimers, a cocatalyst selected from the group consisting of dimethylanilinium tetrakis(perfluorophenyl) borate and triphenylmethyl tetrakis(perfluorophenyl) borate;

(3) to obtain polypropylene, which is essentially isotactic, a cocatalyst selected from the group consisting of tris (perfluorophenyl)borane and isobutyl alumoxane;

(4) to obtain polypropylene, which is a mixture of atactic and isotactic polypropylenes in a weight ratio of atactic to isotactic polypropylenes of about 0.01:1 to about 1:1, a cocatalyst selected from the group consisting of dimethylanilinium tetrakis(perfluorophenyl)borate and triphenylmethyl tetrakis(perfluorophenyl)borate.

10 Claims, No Drawings

US 6,177,527 B1

PROCESS FOR THE PREPARATION OF POLYETHYLENE OR POLYPROPYLENE

TECHNICAL FIELD

This invention relates to the preparation of polyethylene or polypropylene using stereoisomeric mixtures of metallocene catalysts containing cycloalkadienyl ligands.

BACKGROUND INFORMATION

Single site catalysts such as metallocenes have received wide attention for their ability to make polyethylene and polypropylene having relatively narrow molecular weight distributions and uniform comonomer distributions at excellent polymerization rates. Recently, the narrow molecular weight distributions have been addressed and broadened out improving processability.

It is known that particular bridged metallocene catalysts containing cycloalkadienyl ligands epimerize into their racemic and meso forms in the presence of, for instance, light or amines with heating. The racemic form generates isotactic polypropylene, while the meso form produces atactic polypropylene. When bridged metallocene catalysts having cycloalkadienyl ligands are commercially used to make polypropylene, the meso stereoisomer is generally separated out, normally at great cost, to avoid the formation of atactic polypropylene to provide resin for applications in which atactic polypropylene is not desired.

U.S. Pat. No. 5,304,614 and Spaleck et al, "The Influence of Aromatic Substituents on the Polymerization Behavior of Bridged Zirconocene Catalysts", Organomet., 1994, Vol. 13, p. 954, disclose the use of bridged metallocene catalysts having cycloalkadienyl ligands in the production of polypropylene and polyethylene. Each of these references emphasizes the importance of separating out undesirable meso stereoisomers from the catalyst composition. Further, as described by Bercaw et al "Racemo-Meso Isomerization for Ansa-scandocene and Ansa-yttrocene Derivatives", 215th ACS Meeting, held in Dallas, Tex. between Mar. 29 and April 2, 1998, presentation # 059, the interconversion can occur more rapidly at higher temperatures due to more favorable energetics available such that systems which interconvert very slowly at room temperature, equilibrate rapidly above 55 degrees C. Since many of the industrial processes for polymerization are conducted at higher temperatures, there is a real possibility that interconversion can occur during polymerization, further producing the meso epimer and subsequently the atactic polymer this isomer is known to generate.

While there is an industrial need for a process utilizing a metallocene catalyst, which produces resins, which do not have an atactic component, there is a greater need for a process which gives the operator control over the atactic/isotactic components of polypropylene and polyethylene. This can be accomplished by selecting the cocatalyst, which selectively activates only the desired epimer or, alternatively, both epimers; thus, the resin properties (either polyethylene or polypropylene or other) can be varied when a mixture of epimers is present in the catalyst precursor by the correct selection of cocatalyst.

DISCLOSURE OF THE INVENTION

An object of this invention, therefore, is to provide a process for the preparation of polyethylene or polypropylene in which the operator has control over the atactic/isotactic components of polypropylene and polyethylene. Other objects and advantages will become apparent hereinafter.

According to the present invention, such a process has been discovered, i.e., a process for the preparation of (i) polyethylene or (ii) polypropylene, which is essentially isotactic or a mixture of atactic and isotactic polypropylenes comprising contacting ethylene or propylene per se, or in admixture with one or more alpha-olefins, under polymerization conditions, with a catalyst system comprising:

(a) a precatalyst comprising a mixture of racemic and meso stereoisomers of a metallocene catalyst containing two cycloalkadienyl ligands joined by a bridging linkage, said ligands complexed to a metal atom; and (b) (1) to obtain polyethylene from the rac epimer only, a cocatalyst selected from the group consisting of tris (perfluorophenyl)borane and preheated isobutyl alumoxane;

(2) to obtain polyethylene from both epimers, a cocatalyst selected from the group consisting of dimethylanilinium tetrakis(perfluorophenyl)borate and triphenylmethyl tetrakis(perfluorophenyl)borate;

(3) to obtain polypropylene, which is essentially isotactic, a cocatalyst selected from the group consisting of tris (perfluorophenyl)borane and preheated isobutyl alumoxane;

(4) to obtain polypropylene, which is a mixture of atactic and isotactic polypropylenes in a weight ratio of atactic to isotactic polypropylenes of about 0.01:1 to about 1:1, a cocatalyst selected from the group consisting of dimethylanilinium tetrakis(perfluorophenyl)borate and triphenylmethyl tetrakis(perfluorophenyl)borate wherein, in the catalyst system, the atomic ratio of aluminum, if present, to the metal atom in the precatalyst is in the range of about 1:1 to about 1000:1 and the atomic ratio of boron, if present, to the metal atom in the precatalyst is about 1:1 to about 3:1, and when isobutyl alumoxane is used, a mixture of isobutyl alumoxane and the precatalyst is heated to a temperature of at least about 90 degrees C for at least about one hour prior to use.

DESCRIPTION OF THE PREFERRED EMBODIMENT(S)

Polyethylene and polypropylene produced according to the invention include homopolymers, and copolymers with alpha-olefins containing up to about 20 carbon atoms, with densities ranging from 0.860 to 0.950 gram per cubic centimeter. Suitable alpha-olefins include, for example, ethylene, propylene, 1-butene, 1-pentene, 1-hexene, 4-methyl-1-pentene, 1-octene, and 3, 5, 5-trimethyl-1-hexene. Dienes, particularly non-conjugated dienes, can also be included as a comonomer, e.g., to prepare ethylene/propylene rubbers (EPRs) and ethylene/propylene/diene terpolymers (EPDMs) Suitable non-conjugated dienes are linear, branched, or cyclic hydrocarbon dienes having from about 5 to about 20 carbon atoms. Examples of dienes include 1,5-hexadiene, 5-vinyl-2-norbornene, 1,7-octadiene, 2-methyl-pentadiene, 7-methyl-1,6-octadiene, vinyl cyclohexene, dicyclopentadiene, butadiene, isobutylene, isoprene, and ethylidene norbornene. Aromatic compounds having vinyl unsaturation, such as styrene and substituted styrenes, can be included as comonomers as well.

Component (a) of the catalyst system, the precatalyst, is comprised of racemic and meso stereoisomers of a metallocene catalyst containing two cycloalkadienyl ligands joined by a bridging linkage, said ligands complexed to a metal atom. Preferably the metal atom is titanium, zirconium, or hafnium. More preferably, the metal atom is zirconium.

The following compounds are examples of bridged metallocene precatalysts containing two cycloalkadienyl ligands: dimethylsilylbis(indenyl)zirconium dimethide, ethylenebis(indenyl)zirconium dimethide, dimethylsilylbis(4,5,6,7-tetrahydroindenyl)zirconium dimethide, ethylenebis(4, 5,6, 7-tetrahydroindenyl)zirconium dimethide, dimethylsilylbis(2-methylindenyl)zirconium dimethide, dimethylsilylbis(2-methyl-4,5,6,7-tetrahydroindenyl)zirconium dimethide, methylphenylsilylbis(2-methylindenyl)zirconium dimethide, dimethylsilylbis(2,4,7-trimethylindenyl)zirconium dimethide, ethylenebis(2-methylindenyl)zirconium dimethide, ethylenebis(2-methyl-4,5,6,7-tetrahydroindenyl)zirconium dimethide, dimethylsilylbis(2-methyl-4-phenylindenyl)zirconium dimethide, dimethylsilylbis(2-methyl-4-isopropylindenyl)zirconium dimethide, dimethylsilylbis(2-methyl-4-naphthylindenyl)zirconium dimethide, dimethylsilylbis(2,4-dimethylcyclopentadienyl)zirconium dimethide, dimethylsilylbis(2-methyl-4-t-butylcyclopentadienyl)zirconium dimethide, and ethylenebis(2,4-dimethylcyclopentadienyl)zirconium dimethide.

The precatalyst is further exemplified by the following structural formula:

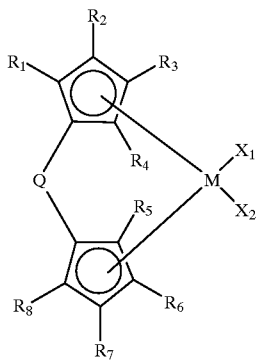

wherein $R_1$ to $R_8$ are the same or different monovalent substituents selected from the group consisting of alkyl, aryl, alkylaryl, arylalkyl, hydrogen, halogen, and hydrocarboxy, and any two of $R_1$ to $R_8$ can be connected to form a ring of 4 to 8 atoms such that if $R_1=R_4$, then $R_2=R_3$; if $R_2=R_3$, then $R_1=R_4$; if $R_5=R_8$, then $R_6=R_7$; and if $R_6=R_7$, then $R_5=R_8$, the symbol "=" denoting both chemical and stereochemical equivalence;

Q is a divalent substituent selected from the group consisting of alkylidene, dialkylsilylene, dialkylgermylene, and cycloalkylidene;

M is a transition metal selected from Group 4, and is preferably zirconium or hafnium; and $X_1$ and $X_2$ are the same or different, and are monovalent ligands selected from the group consisting of alkyl, aryl, alkylaryl, arylalkyl, and hydrogen.

Preferably, the bridged metallocene precatalyst is dimethylsilyl-bis(2-methylindenyl)zirconium dimethide. Dimethylsilylbis(2-methylindenyl)zirconium dimethide is defined by the formula immediately above wherein $R_1$ and $R_5$ are each methyl; $R_2$ and $R_6$ are each hydrogen; $R_3$ and $R_4$ connect to form —CH=CH—CH=CH—; $R_7$ and $R_8$ connect to form —CH=CH—CH=CH—; Q is dimethylsilyl; M is zirconium; and $X_1$ and $X_2$ are each methyl. A mixture of the racemic and meso stereoisomers of dimethylsilylbis (2-methylindenyl)zirconium dimethide is especially preferred in preparing the catalyst compositions useful in the process of this invention.

For discussions of bridged and metallocene catalysts used in the stereospecific production of polypropylene, see, for example, U.S. Pat. No. 5,314,973; Ewen, "Mechanisms of Stereochemical Control in Propylene Polymerizations with Soluble Group 4B Metallocene/Methylalumoxane Catalysts", *J. Am. Chem. Soc.*, 1984, Vol. 106, p. 6355; and Kaminsky et al., "Polymerization of Propene and Butene with a Chiral Zirconocene and Methylalumoxane as Cocatalyst", *Angew. Chem. Int. Ed. Eng.*, 1985, Vol. 24, No. 6, p. 507.

The bridged metallocene catalyst can be made by one of several methods. The method of manufacture is not critical. For example, see A. Razavi and J. Ferrara, J. Organomet. Chem., 435, 299 (1992) and K. P. Reddy and J. L. Petersen, Organometallics, 8, 2107 (1989). One method comprises first reacting two equivalents of an optionally substituted cyclopentadiene with a metallic deprotonating agent such as an alkyllithium or potassium hydride in an organic solvent such as tetrahydrofuran, followed by reaction of this solution with a solution of one equivalent of a doubly-halogenated compound such as dichlorodimethylsilane. The resulting ligand is then isolated by conventional methods known to those skilled in the art (such as distillation or liquid chromatography), reacted with two equivalents of a metallic deprotonating agent as above, and then reacted with one equivalent of a tetrachloride of titanium, zirconium, or hafnium, optionally coordinated with donor ligand molecules such as tetrahydrofuran, in organic solvent. The methide is generated from the dichloride by reacting two equivalents of the Grignard reagent, MeMgBr, with the dichloride in diethyl ether solvent at minus 78 degrees C with vigorous stirring. The resulting dimethide bridged metallocene catalyst is isolated by methods known to those skilled in the art such as recrystallization or sublimation.

Alternatively, the bridged metallocene catalyst can be produced by first reacting one equivalent of an optionally substituted cyclopentadiene with one equivalent of metallic deprotonating agent in an organic solvent as above, followed by reaction with one equivalent of a molecule containing an unsaturated five-carbon ring to which is attached an exocyclic group susceptible to nucleophilic attack, such as a dialkylfulvene. The reactive solution is next quenched with water and the ligand is isolated by conventional methods. One equivalent of the ligand is next reacted with two equivalents of metallic deprotonating agent as above and the resulting solution is in turn reacted with one equivalent of a tetrachloride of titanium, zirconium, or hafnium optionally coordinated with donor ligand molecules such as tetrahydrofuran, in organic solvent. The methide is generated from the dichloride by reacting two equivalents of the Grignard reagent, MeMgBr, with the dichloride in diethyl ether solvent at minus 78 degrees C with vigorous stirring. The resulting dimethide bridged metallocene catalyst is isolated by methods known to those skilled in the art.

One of the cocatalysts is isobutylaluminoxane (IBAO). Aluminoxanes can be prepared in a variety of ways. Generally, linear aluminoxanes are obtained from, for example, triisobutylaluminum and water. In the case of methyl alumoxane, the hydrolysis ratio of 0.7 (that is, the ratio of trimethylaluminum to water is 0.7) yields an oligomeric material having either cyclic or linear structures represented by the formula:

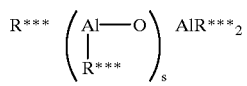

and oligomeric cyclic alkyl aluminoxanes of the formula:

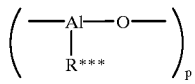

wherein 1 is 1 to 40, preferably 10 to 20; p is 3 to 40, preferably 3 to 20; and R*** is an alkyl group containing 1 to 12 carbon atoms, preferably methyl or an aryl radical such as a substituted or unsubstituted phenyl or naphthyl radical. Aluminoxanes may be prepared in a variety of ways well known in the art. It is also well known in the art that the unreacted trimethylaluminum is strongly bound to the methyl alumoxanes (as described in Resconi et al., Macromolecules, 1990, vol. 23, pp.4489 to 4491).

For example, an aluminum alkyl can be treated with water in the form of a moist solvent. Alternatively, an aluminum alkyl, such as triisobutylaluminum, can be contacted with a hydrated salt, such as hydrated ferrous sulfate. The latter method comprises treating a dilute solution of triisobutyla-luminum in, for example, toluene with a suspension of ferrous sulfate heptahydrate. It is also possible to form isobutyl aluminoxanes by the reaction of a tetraalkyldialu-minoxane containing $C_2$ or higher alkyl groups with an amount of triisobutylaluminum that is less than a stoichiometric excess. The synthesis of isobutylaluminoxanes can also be achieved by the reaction of a trialkyl aluminum compound or a tetraalkyldialuminoxane containing $C_2$ or higher alkyl groups with water to form a polyalkyl aluminoxane, which is then reacted with triisobutylalumi-num.

In contrast to methyl alumoxane (MAO), isobutyl alu-moxane (IBAO), when prepared at a hydrolysis ratio of 0.7, appears to yield the trimer and free unreacted triisobutyl aluminum. There is a tendency, in both the open and patent literature, to treat all alumoxanes as being substantially the same; however, but for one or two exceptional cases, the use of IBAO or ethyl alumoxane (EAO) rarely yield any polymerization activity with the metallocene precatalysts used. In the process of this invention, it is necessary that the IBAO and precatalyst be heated prior to use, i.e., the IBAO/precatalyst mixture is heat activated. This can be accomplished by mixing the IBAO with the precatalyst in a suitable solvent, i.e., one that is inert to the process components, and heating the mixture to at least about 90 degrees C for a minimum of one hour prior to use. The temperature and time can be adjusted upward to 110 degrees C and 5 hours, or even higher, to accomplish the preheating.

The other cocatalysts of interest here are an organic borane complex or compound and an organic borate complex or compound. The complexes and compounds are neutral or cationic. The complexes of interest here are tris(perfluorophenyl)borane (boron complex A), dimethyla-nilinium tetrakis(perfluorophenyl)borate (boron complex B), and triphenylmethyl tetrakis(perfluorophenyl)borate (boron complex C). They can be readily purchased from Witco Corporation, Albemarle Corporation, or the Boulder Scientific Company, but can alternatively be prepared readily by one skilled in the art.

The amount of metallocene precatalyst and cocatalyst usefully employed in the catalyst system can vary over a wide range. Preferably, the catalyst system is present at a concentration sufficient to provide at least about 0.000001, preferably at least about 0.00001, percent by weight of transition metal based on the total weight of ethylene or propylene and other comonomers. The atomic ratio of aluminum atoms contained in the cocatalyst to metal atoms contained in the metallocene precatalyst can be, in the case of IBAO, in the range of about 1:1 to about 1000:1, and is preferably in the range of about 1:1 to about 250:1. The atomic ratio of boron atoms contained in the cocatalyst to metal atoms contained in the metallocene precatalyst can be, in the case of the boron complexes mentioned above, in the range of about 1:1 to about 5:1, and is preferably in the range of about 1:1 to about 3:1.

It is preferred not to use a support. However, in those cases where it is desired to support the precursor, silica is the preferred support. Other suitable supports are inorganic oxides such as aluminum phosphate, alumina, silica/alumina mixtures, silica modified with an organoaluminum compound such as triethylaluminum, silica modified with diethyl zinc, and magnesium dichloride. Organic supports such as polystyrene, polyethylene, polypropylene, or polycarbonate can also be used. A typical support is a solid, particulate, porous material essentially inert to the polymerization. It is used as a dry powder having an average particle size of about 10 to about 250 microns and preferably about 30 to about 100 microns; a surface area of at least 200 square meters per gram and preferably at least about 250 square meters per gram; and a pore size of at least about 100 angstroms and preferably at least about 200 angstroms. Generally, the amount of support used is that which will provide about 0.1 to about 1.0 millimole of metal per gram of support and preferably about 0.4 to about 0.9 millimole of metal per gram of support. Impregnation of the above mentioned catalyst system into a silica support can be accomplished by mixing the precursor and silica gel in a solvent followed by solvent removal under reduced pressure. When a support is not desired, the catalyst system can be used in liquid form.

The entire catalyst system, which includes the precatalyst and the cocatalyst, is added to the reactor. The polymerization is, preferably, conducted in the gas phase using a continuous fluidized process. A typical fluidized bed reactor is described in U.S. Pat. No. 4,482,687. A stirred reactor is also a desirable option.

The homopolymer or copolymer, which is prepared, can have a melt index in the range of about 0.1 to about 100 grams per 10 minutes, and preferably in the range of about 0.5 to about 30 grams per 10 minutes. The density of the polymer can be at least 0.860 gram per cubic centimeter, and is preferably in the range of 0.890 to 0.945 gram per cubic centimeter. The melt flow ratio of the polymer can be in the range of about 16 to about 200, and is preferably about 16 to about 80.

Melt index is determined under ASTM D-1238, Condition E. It is measured at 190 degrees C and 2.16 kilograms and reported as grams per 10 minutes. Flow index is determined under ASTM D-1238, Condition F. It is measured at 190 degrees C and 10 times the weight used in determining the melt index, and reported as grams per 10 minutes. Melt flow ratio is the ratio of flow index to melt index.

Tris(perfluorophenyl)borane is boron complex A; dim-ethylanilinium tetrakis(perfluorophenyl)borate is boron complex B; and triphenylmethyl tetrakis(perfluorophenyl) borate is boron complex C.

In the reactor: The mole ratio of alpha-olefin to ethylene can be in the range of about 0.00005:1 to about 0.09:1, and is preferably in the range of about 0.005:1 to about 0.05:1. It is preferred that the reactor is essentially devoid of free hydrogen.

The operating temperature can be in the range of about 40 to about 105 degrees C. Preferred operating temperatures vary depending on the density desired, i.e., lower temperatures for lower densities and higher temperatures for higher densities. A temperature of at least about 55 degrees C is generally required for epimerization.

The pressure, i.e., the total pressure in the reactor, can be in the range of about 50 to about 400 psig (pounds per square inch gauge) and is preferably in the range of about 100 to about 350 psig. The primary monomer (ethylene or propylene) partial pressure can be in the range of about 50 to about 250 psi and is preferably in the range of about 120 to about 230 psi. The balance of the total pressure is provided by alpha-olefin other than ethylene or propylene and an inert gas such as nitrogen.

A typical fluidized bed reactor can be described as follows: The bed is usually made up of the same granular resin that is to be produced in the reactor. Thus, during the course of the polymerization, the bed comprises formed polymer particles, growing polymer particles, and catalyst particles fluidized by polymerization and modifying gaseous components introduced at a flow rate or velocity sufficient to cause the particles to separate and act as a fluid. The fluidizing gas is made up of the initial feed, make-up feed, and cycle (recycle) gas, i.e., comonomers and, if desired, modifiers and/or an inert carrier gas.

The essential parts of the reaction system are the vessel, the bed, the gas distribution plate, inlet and outlet piping, a compressor, cycle gas cooler, and a product discharge system. In the vessel, above the bed, there is a velocity reduction zone, and, in the bed, a reaction zone. Both are above the gas distribution plate.

The gaseous feed streams of ethylene or propylene and other gaseous alpha-olefins are preferably fed to the reactor recycle line as well as liquid alpha-olefins and the precatalyst/cocatalyst solution. Optionally, the precatalyst/ cocatalyst solution can be fed directly to the fluidized bed. The product composition can be varied by changing the molar ratios of the comonomers introduced into the fluidized bed. The product is continuously discharged in granular or particulate form from the reactor as the bed level builds up with polymerization. The production rate is controlled by adjusting the catalyst feed rate andlor the ethylene partial pressures in both reactors.

The alpha-olefins (other than the primary monomer, i.e., ethylene or propylene) can be present in a total amount of up to 15 percent by weight of the copolymer and, if used, are preferably included in the copolymer in a total amount of about 1 to about 10 percent by weight based on the weight of the copolymer.

Several steps can be taken, in addition to temperature control, to prevent agglomeration. The product discharge line between the reactor and the product pot is often plugged up with chunks between intervals of product drops. A continuous purge flow of nitrogen or reactor gas in the line prevents the plugging problem. Also, coating the reactor surface with a low surface energy material is shown to be beneficial to slow down the rate of fouling build up. In addition, control of the electrostatic level in the bed prevents static induced particle agglomeration. Static can be adjusted to a satisfactory level by controlled use of reaction rate, avoidance of quick change of gas composition, selective use of static-neutralizing chemicals and surface passivation with aluminum alkyls.

It is preferred to control the static in the reactor system during start-up. If the static is not controlled, static induced layers of catalyst rich fines can form on the reactor surfaces. These fines may, in turn, induce localized hot spots and the formation of chunks. Reactor surface passivation with an aluminum alkyl minimizes the formation of fines layers. This passivation is accomplished by first building up the aluminum alkyl concentration in the start-up bed to about 300 to 1000 ppm based on the weight of the bed, and then fluidizing the bed with purified nitrogen or ethylene for several hours. At the end of this passivation period, the reactor is purged while maintaining the circulation, the reaction conditions are established, and the reaction is kicked off by feeding catalyst into the system. If static still persists, additional purges or selective use of static neutralizing chemicals may become necessary to reduce the level of static.

As noted, polymerization can be effected in conventional gas phase processes. The preferred polymerization process is a gas phase process employing a fluidized bed. Gas phase processes employable in the present invention can include "condensed-mode," and "liquid-mode" processes. The polymerizations can be carried out in a single reactor or multiple reactors, typically, two or more in series.

In many processes, it is desirable to include a scavenger in the reactor to remove adventitious poisons such as water or oxygen before they can lower catalyst activity. In such cases, it is recommended that trialkylaluminum species not be used, but rather that alumoxanes such as methylalumoxane be employed for such purposes.

Conventional fluidized processes are disclosed, for example, in U.S. Pat. Nos. 3,922,322; 4,035,560; 4,994,534, and 5,317,036. Condensed mode polymerizations, including induced condensed mode, are taught, for example, in U.S. Pat. Nos. 4,543,399; 4,588,790; 4,994,534; 5,317,036; 5,352,749; and 5,462,999.

Liquid mode or liquid monomer polymerization mode is described in U.S. Pat. No. 4,453,471; U.S. application Ser. No. 510,375; and two international applications: WO 96/04322 (PCT/US95/09826) and WO 96/04323 (PCT/US95/09827). For polymerizations such as ethylene-propylene copolymer (e.g., EPMs), ethylene-propylene-diene terpolymer (e.g., EPDMs), and diolefin polymerizations, it is preferable to use liquid mode and employ an inert particulate material as a fluidization aid. Inert particulate materials are described, for example, in U.S. Pat. No. 4,994,534 and include carbon black, silica, clay, talc, and mixtures thereof.

The residence time of the mixture of reactants including gaseous and liquid reactants, catalyst, and resin in the fluidized bed can be in the range of about 1 to about 12 hours and is preferably in the range of about 2 to about 5 hours.

The resin can be extruded, for example, into film in a conventional extruder adapted for that purpose. Extruders and processes for extrusion are described in U.S. Pat. Nos. 4,814,135; 4,857,600; 5,076,988; and 5,153,382. Examples of various extruders, which can be used in forming the film are a single screw type such as one modified with a blown film die and air ring and continuous take off equipment, a blown film extruder, and a slot cast extruder. A typical single screw type extruder can be described as one having a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and multiple heating zones from the rear heating zone to the front heating zone, the multiple sections and zones running from upstream to downstream. If it has more than one barrel, the barrels are connected in series. The length to diameter ratio of each barrel is in the range of about 16:1 to about 30:1. The extrusion can take place at temperatures in the range of about 160 to about 270 degrees C, and is preferably carried out at temperatures in the range of about 180 to about 240 degrees C.

The advantages of the invention lie in the control of the atactic/isotactic components in polypropylene and the control of the PDI in polyethylene by controlling the ability of each epimer of the precatalyst to act as a catalyst for polymerization; the cost savings in not having to separate the meso stereoisomer from the racemic stereoisomer; and the reduction in cost in using IBAO over other alumoxanes.

Conventional additives, which can be introduced into the product resin, are exemplified by antioxidants, ultraviolet absorbers, antistatic agents, pigments, dyes, nucleating agents, fillers, slip agents, fire retardants, plasticizers, processing aids, lubricants, stabilizers, smoke inhibitors, viscosity control agents, and crosslinking agents, catalysts, and boosters, tackifiers, and anti-blocking agents. Aside from the fillers, the additives can be present in the resin in amounts of about 0.1 to about 10 parts by weight of additive for each 100 parts by weight of polymer blend. Fillers can be added in amounts up to 200 parts by weight and more for each 100 parts by weight of the blend.

All molecular weights are weight average molecular weights unless otherwise specified.

Patents, patent applications, and publications mentioned in this specification are incorporated by reference herein.

The ability to control the polymerization activity of each epimer independently of the other epimer is illustrated by the following examples.

EXAMPLES

All the solvents used are dried over sodium/benzophenone and distilled under vacuum into Teflon™-sealed flasks. These solvents are then used only in the glovebox under inert conditions. All glassware is assembled while hot from an oven, and is evacuated once assembled on a vacuum line to remove air/moisture. Toluene-$d_8$ and thf-$d_8$ used for NMR (nuclear magnetic resonance) studies are also dried over sodium and distilled under vacuum. (thf= tetrahydrofuran).

Samples of boron-based activators B(C6F5)3 (boron complex A), a white solid); [HN(CH3)2(C6H5)][B(C6F5)4] (boron complex B, a yellow solid); and [(C6H5)3C][B (C6F5)4] (boron complex C, a yellow solid) are also obtained. These activators are collectively referred to in the open literature as the "BArF" cocatalysts. Isobutyl alumoxane (IBAO) at various hydrolysis ratios is also obtained and used as is. These activators have a determined structure unlike the alumoxanes, and are readily available.

In these examples, the metallocene precatalyst, dimethylsilylbis(2-methyl-1-indenyl)zirconium dichloride, is converted to dimethylsilylbis(2-methyl-1-indenyl) zirconium dimethide. Samples of the initial precatalyst are obtained as mixtures of the two rac/meso diastereoisomers at various ratios, the ratio of isomers being quantified by NMR spectroscopy. This work primarily studies 30:1 and 1:30 ratios of the rac/meso diastereoisomers which appear as reddish-orange solids.

Preparation of rac- and meso-dimethylsilylbis(2-methyl-1-indenyl)zirconium 'dimethide: Following a literature procedure for the alkylation of zirconocene dihalide species, a reaction flask is loaded with rac-dimethylsilylbis(2-methyl-1-indenyl)zirconium dichloride (1.023 grams, 2.15 millimoles) in the glovebox. Upon removal and attachment to a vacuum line, diethyl ether (40 milliliters, stored over sodium benzophenone ketyl), is vacuum transferred onto the solid at minus 78 degrees C. Excess MethylMgBr (2.0 milliliters of a 3.0 M solution in diethyl ether) is syringed into the rac dimethylsilylbis(2-methyl-1-indenyl)zirconium dichloride solution under a rapid purge of nitrogen while the reaction is kept at minus 78 degrees C. The reaction mixture is then stirred under a nitrogen atmosphere, allowed to reach room temperature and stirred overnight.

The solvent is removed under vacuum, and the solid titurated with toluene (25 milliliters) twice. The yellow solid is dissolved/suspended in toluene and filtered through a medium porosity filter. The filtered solid appears whitish and the filtrate is a clear yellowish solution. Removal of solvent from the filtrate yields a yellowish solid, which is dried under vacuum at room temperature. The dimethylsilylbis(2-methyl-1-indenyl)zirconium dimethide is indefinitely (about 6 months) stable in the solid state but has some variable stability in toluene solvent; fresh solutions (less than 2 hours old) of this complex are used for each study.

Polymerization Experiments using the dimethide precatalyst with various cocatalysts:

Polyethylene samples are made using catalyst compositions comprising racemic and meso stereoisomers of dimethylsilylenebis(2-methylindenyl)zirconium dimethide ($Me_2Si$(2-MeInd)-$ZrMe_2$), a bridged metallocene catalyst containing two cycloalkadienyl ligands having facial chirality, in a slurry phase reactor.

The slurry phase reactions are conducted as follows: A 1.6 liter stainless steel autoclave reactor equipped with a mechanical agitator is prepared by heating the reactor to 110 degrees C while being purged with a strong stream of dry nitrogen gas to liberate and expunge any absorbed moisture from the interior of the reactor. Once cooled to 55 degrees C, the reactor is filled with dried, oxygen-free hexanes (500 mL) and 1-hexene (20 mL). Tri-isobutylaluminum (0.1 mL of a 1.6 M solution in heptane) is added to scavenge any remaining impurities from the contents of the reactor. (mL= milliliters)

In an inert atmosphere chamber (glovebox), the appropriate epimer is added to a vial followed by one mole equivalent (or 200 to 300 mole equivalents of IBAO) of the BArF cocatalyst being tested. To this is added an amount of solvent (toluene) such that the solution just made would contain 1 micromole of the zirconocene reagent per mL of solution. The vial is then crimped shut using a Teflon®-faced septum and cap, and stored in the glovebox until needed. For the IBAO examples, the vial is removed from the glovebox and placed in an oil bath which has been pre-equilibrated at 90 degrees C for one hour to facilitate the activation of the catalyst. Using a syringe, 1.0 mL of this activated catalyst solution is then withdrawn from the vial and added to the polymerization reactor. The temperature of the reactor is raised to 85 degrees C, and the reaction initiated by admission of ethylene into the reactor such that the total reactor pressure is 150 psi, whereupon the ethylene is fed to the reactor on demand. The reaction is terminated after 30 minutes by rapidly cooling the reactor and venting the pressure to remove substantially the ethylene present.

The following two counter-examples (A and B), also documented in U.S. Pat. No. 5,852,143, show that alumoxanes such as methyl alumoxane (MAO) or modified methyl alumoxanes (MMAO) activate both epimers concomitantly without any pre-heating steps. The resin characterization data provided allows one skilled in the art to recognize that different resins are made by each epimer:

Counter-example A: A stock solution of rac-dichloride precatalyst and MMAO in toluene is prepared in the glovebox. This solution is not heated prior to use. 1.0 mL of this solution is injected into the reactor and an activity of 33,400 g PE/9 mmol Zr×hour×100 psi ethylene) was obtained. The following polymer properties are measured: the flow index is 70, peak melting point is 108 degrees C, the 1-hexene incorporation is measured at 20 butyl branches per 1000 carbons.

Counter-example B: A stock solution of meso-dichloride precatalyst and MMAO in toluene is prepared in the glovebox. This solution is not heated prior to use. 1.0 mL of this solution is injected into the reactor and an activity of 70,000 g PE/9 mmol Zr×hour×100 psi ethylene) was obtained. The following polymer properties are measured: the flow index is 662, PDI=2.8, dual peak melting points are 115/90 degrees C, the 1-hexene incorporation is measured at 28 butyl branches per 1000 carbons.

The following four examples (C,D, E, and F) show that variation of the boron cocatalyst allows for the selective activation of one epimer or both epimers within a precatalyst, which had a mixture of epimers present. In all cases, the rac epimer is active with the cocatalyst used; only the activity of the meso epimer is being effected:

Example C: A stock solution of rac-dimethide precatalyst and boron compound A in toluene is prepared in the glovebox. 1.0 mL of this solution is injected into the reactor and an activity of 39,400 g PE/9 mmol Zr×hour×100 psi ethylene) was obtained. The following polymer properties are measured: the flow index is 8.8, PDI=2.4, peak melting point is 107 degrees C, the 1-hexene incorporation is measured at 28 butyl branches per 1000 carbons.

Example D: This experiment is conducted as described in Example C with the exception that the meso-dimethide precatalyst is used in place of the rac epimer. No polymer is obtained from this experiment.

Example E: A stock solution of meso-dimethide precatalyst (0.0050 grams) and boron compound C (0.0050 grams) in toluene (5 mL) is prepared in the glovebox. 1.0 mL of this solution is injected into the reactor and an activity of 32,000 g PE/9 mmol Zr×hour×100 psi ethylene) is obtained. The following polymer properties are measured: peak melting point is 115 degrees C.

Example F: A stock solution of meso-dimethide precatalyst and boron compound B in toluene is prepared in the glovebox. 1.0 mL of this solution is injected into the reactor and an activity of 31,300 g PE/9 mmol Zr×hour×100 psi ethylene) is obtained. The following polymer properties are measured: peak melting point is 111 degrees C, the 1-hexene incorporation is measured at 21 butyl branches per 1000 carbons.

The following counter-example (G) shows that the procedure followed in the counter-examples A and B above wherein MAO or MMAO is substituted by IBAO does not result in polymerization activity regardless of which epimer is present:

Counter-example G: A stock solution of rac-dimethide precatalyst and IBAO in toluene is prepared in the glovebox. 1.0 mL of this solution is injected into the reactor, without any heating of this mixture prior to addition to the reactor, No polymerization activity was detected.

The following two examples (H and I) show that the activity of each epimer with IBAO as the cocatalyst can be radically effected and that a separate step involving heating the mixture of precatalyst and IBAO is another necessary variable for polymerization activity:

Example H: A stock solution of rac-dimethide precatalyst and IBAO in toluene is prepared in the glovebox. This stock solution was removed from the glovebox and placed in an oil bath for one hour which had been pre-equilibrated at 90 degrees C. 1.0 mL of this solution is injected into the reactor and an activity of 21,700 g PE/9 mmol Zr×hour×100 psi ethylene) is obtained. The following polymer properties are measured: the PDI=2.2, peak melting point is 103 degrees C, the 1-hexene incorporation is measured at 20 butyl branches per 1000 carbons.

Example I: The experiment is conducted as described in Example H except that the meso epimer is used in place of the rac epimer. No polymerization activity is detected.

TABLE I

Summary of Polymerization Data for Dimethide Precatalyst based Catalysts

| Example | epimer | cocatalyst (1) | MP,° C. (2) | BBF (3) | Activity (4) | PDI (5) |
|---|---|---|---|---|---|---|
| Counter-Example A | rac | MMAO | 108 | 20 | 33,400 | — |
| Counter-Example B | meso | MMAO | 115/90 | 28 | 70.000 | 2.8 |
| C | rac | Boron Complex A | 107 | 28 | 39,400 | 2.4 |
| D | meso | Boron Complex A | — | — | none | — |
| E | meso | Boron Complex C | 115 | | 32,000 | — |
| F | meso | Boron Complex B | 111 | 21 | 31,300 | — |
| Counter-example G | rac | IBAO (no heat) | — | — | none | — |
| H | rac | IBAO (heat 1 hr at 90° C.) | 103 | 20 | 21,700 | 2.2 |
| I | meso | IBAO (heat 1 hr at 90° C.) | — | — | none | — |

(1) MMAO/Zr=450 (200 cc hydrogen used); boron complexA/Zr=1 (no hydrogen); boron complex B or boron complex C/Zr=1 (no hydrogen); IBAO/Zr=750 (no hydrogen). All experiments are done in hexane diluent at 85 degrees C and run for 30 minutes. Total reactor pressure is 150 psia.
(2) Measured by DSC
(3) Measured by NMR
(4) Stated in terms of grams PE/(mmol Zr×hour×100 psi ethylene), corrected for the partial pressure of other reactants
(5) Measured by size exclusion chromatography.

What is claimed is:

1. A process for the preparation of (i) polyethylene or (ii) polypropylene comprising contacting ethylene or propylene per se, or in admixture with one or more alpha-olefins, under polymerization conditions, with a catalyst system comprising:

(a) a precatalyst comprising a mixture of racemic and meso stereoisomers of a metallocene catalyst containing two cycloalkadienyl ligands joined by a bridging linkage, said ligands complexed to a metal atom; and (b) a cocatalyst selected from the group consisting of tris(perfluorophenyl)borane and isobutyl alumoxane wherein, in the catalyst system, the atomic ratio of aluminum, if present, to the metal atom in the precatalyst is in the range of about 1:1 to about 1000:1 and the atomic ratio of boron, if present, to the metal atom in the precatalyst is about 1:1 to about 3:1, and when isobutyl alumoxane is used, a mixture of isobutyl alumoxane and the precatalyst is heated to a temperature of at least about 90 degrees C for at least about one hour prior to use wherein the catalysis is effected by the racemic stereoisomer together with the cocatalyst.

2. The process defined in claim 1 wherein the metal atom is selected from the group consisting of titanium, zirconium and hafnium.

3. The process defined in claim 1 wherein the bridged metallocene precatalysts have the following structural formula:

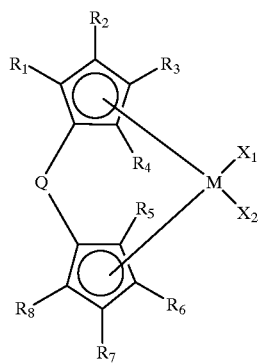

wherein $R_1$ to $R_8$ are the same or different monovalent substituents selected from the group consisting of alkyl, aryl, alkylaryl, arylalkyl, hydrogen, halogen, and hydrocarboxy and any two of $R_1$ to $R_8$ can be connected to form a ring of 4 to 8 atoms such that if $R_1=R_4$, then $R_2=R_3$; if $R_2=R_3$, then $R_1=R_4$; if $R_5=R_8$, then $R_6=R_7$; and if $R_6=R_7$, then $R_5=R_8$, the symbol "=" denoting both chemical and stereochemical equivalence;

Q is a divalent substituent selected from the group consisting of alkylidene, dialkylsilylene, dialkylgermylene, and cycloalkylidene;

M is a transition metal selected from Group 4; and $X_1$ and $X_2$ are the same or different, and are monovalent ligands selected from the group consisting of alkyl, aryl, alkylaryl, arylalkyl, and hydrogen.

4. The process defined in claim 1 wherein ethylene is copolymerized with an alpha-olefin selected from the group consisting of propylene, 1-butene, 1-hexene, 4-methyl-1-pentene, 1-octene, and mixtures thereof or propylene is copolymerized with an alpha-olefin selected from the group consisting of ethylene, 1-butene, 1-hexene, 4-methyl-1-pentene, 1-octene, and mixtures thereof.

5. The process defined in claim 1 wherein both the racemic and meso stereoisomers are each present during polymerization in amounts greater than about 2 percent by weight of the total weight of the metallocene catalyst.

6. The process defined in claim 1 wherein component (a) of the catalyst system comprises a mixture of racemic and meso stereoisomers of dimethylsilylbis(2-methyl-indenyl) zirconium dimethide.

7. The process defined in claim 1 wherein ethylene is copolymerized with propylene and a diene.

8. The process defined in claim 1 wherein the atomic ratio of aluminum, if present, to the metal atom in the precatalyst is in the range of about 1:1 to about 250:1 and the atomic ratio of boron, if present, is in the range of about 1:1 to about 3:1.

9. The process defined in claim 1 wherein the process is carried out under polymerization conditions essentially devoid of free hydrogen.

10. A process for the preparation of (i) polyethylene or (ii) polypropylene comprising contacting ethylene and an alpha-olefin selected from the group consisting of propylene, 1-butene, 1-hexene, 4-methyl-1-pentene, 1-octene, and mixtures thereof or propylene and an alpha-olefin selected from the group consisting of ethylene, 1-butene, 1-hexene, 4-methyl-1-pentene, 1-octene, and mixtures thereof, under polymerization conditions essentially devoid of free hydrogen, with a catalyst system comprising:

(a) a precatalyst comprising a mixture of racemic and meso stereoisomers of a metallocene catalyst containing two cycloalkadienyl ligands joined by a bridging linkage, said ligands complexed to a metal atom selected from the group consisting of titanium, zirconium and hafnium, wherein both the racemic and meso stereoisomers are each present during polymerization in amounts greater than about 2 percent by weight of the total weight of the metallocene catalyst; and (b) a cocatalyst selected from the group consisting of tris(perfluorophenyl)borane and isobutyl alumoxane wherein, in the catalyst system, the atomic ratio of aluminum, if present, to the metal atom in the precatalyst is in the range of about 1:1 to about 250:1 and the atomic ratio of boron, if present, to the metal atom in the precatalyst is about 1:1 to about 3:1, and when isobutyl alumoxane is used, a mixture of isobutyl alumoxane and the precatalyst is heated to a temperature of at least about 90 degrees C for at least about one hour prior to use wherein the catalysis is effected by the racemic stereoisomer together with the cocatalyst.

* * * * *